US008152026B2

(12) United States Patent
Ki

(10) Patent No.: US 8,152,026 B2
(45) Date of Patent: Apr. 10, 2012

(54) NOZZLE RETRACTABLE DISPENSER

(75) Inventor: Joong Hyun Ki, Incheon (KR)

(73) Assignee: Yonwoo Co., Ltd., Incheon (KR)

( * ) Notice: Subject to any disclaimer, the term of this patent is extended or adjusted under 35 U.S.C. 154(b) by 444 days.

(21) Appl. No.: 12/516,527

(22) PCT Filed: May 8, 2008

(86) PCT No.: PCT/KR2008/002579

§ 371 (c)(1),
(2), (4) Date: May 27, 2009

(87) PCT Pub. No.: WO2009/028783

PCT Pub. Date: Mar. 5, 2009

(65) Prior Publication Data

US 2010/0051649 A1 Mar. 4, 2010

(30) Foreign Application Priority Data

Aug. 27, 2007 (KR) ........................ 10-2007-0086104

(51) Int. Cl.
*G01F 11/00* (2006.01)
*B67B 1/00* (2006.01)
*B65D 88/54* (2006.01)

(52) U.S. Cl. ................ 222/153.13; 222/256; 222/321.7; 222/384; 222/522; 222/526

(58) Field of Classification Search ............. 222/153.11, 222/153.13, 256, 321.7, 384, 402.11, 522, 222/526
See application file for complete search history.

(56) References Cited

U.S. PATENT DOCUMENTS 2,678,147 A * 5/1954 Abplanalp .................... 222/545
3,276,641 A * 10/1966 Lehmann ...................... 222/526
3,386,631 A * 6/1968 Kotuby .................... 222/402.11
(Continued)

FOREIGN PATENT DOCUMENTS

JP 2002224601 8/2002
(Continued)

*Primary Examiner* — Kevin P Shaver
*Assistant Examiner* — Nicholas Weiss
(74) *Attorney, Agent, or Firm* — IPLA P.A.; James E. Bame

(57) ABSTRACT

Provided is a nozzle retractable dispenser which includes a container (20); a cylinder (22); a piston (24); a pressing member (28); an elastic unit (30); a pumping button (36), in which a button portion (32) is formed at the upper portion of the pressing member (28), and a nozzle (34) communicating with the communication hole (26) is protruded in a lateral direction of the pressing member (28); and a cover member (40). Here, the pumping button (36) goes slidingly forward and backward with respect to the pressing member (28) at the state where the pumping button (36) has been elastically supported by the elastic unit (30), so as to be withdrawn and retracted in the lateral direction of the container (20). Accordingly, the nozzle can be withdrawn in a sufficient length in the lateral direction of a container during use, by a simple operation of slidingly manipulating the pumping button. As a result, it is convenient for a user to use the dispenser and to receive contents of the container through an exit of the tip of the nozzle. In addition, when not in use, the pumping button goes slidingly backward so as to be retracted into the inside of the container, to thus make the dispenser easily kept in custody. Further, there is no need to use a particular over-cap to thus obtain a more compact structure of the dispenser.

4 Claims, 5 Drawing Sheets

U.S. PATENT DOCUMENTS

| | | | | | |
|---|---|---|---|---|---|
| 3,429,483 | A | * | 2/1969 | Micallef | 222/153.11 |
| 3,622,052 | A | * | 11/1971 | Gach | 222/402.11 |
| 3,734,353 | A | * | 5/1973 | McIlhenny | 222/153.11 |
| 3,749,286 | A | * | 7/1973 | Douglas | 222/153.11 |
| 3,967,760 | A | * | 7/1976 | Marcon | 222/153.11 |
| 4,679,712 | A | * | 7/1987 | Foster et al. | 222/384 |
| 4,779,773 | A | | 10/1988 | Bennett | |
| 5,284,264 | A | * | 2/1994 | Gross | 215/237 |
| 5,845,823 | A | * | 12/1998 | Lindmayer | 222/545 |
| 6,398,082 | B2 | * | 6/2002 | Clark et al. | 222/402.11 |
| 2007/0194050 | A1 | * | 8/2007 | Krampen et al. | 222/153.13 |
| 2008/0017668 | A1 | * | 1/2008 | Patrick | 222/153.11 |

FOREIGN PATENT DOCUMENTS

| | | |
|---|---|---|
| WO | WO 00/78615 | 12/2000 |

* cited by examiner

[Fig. 1]
PRIOR ART
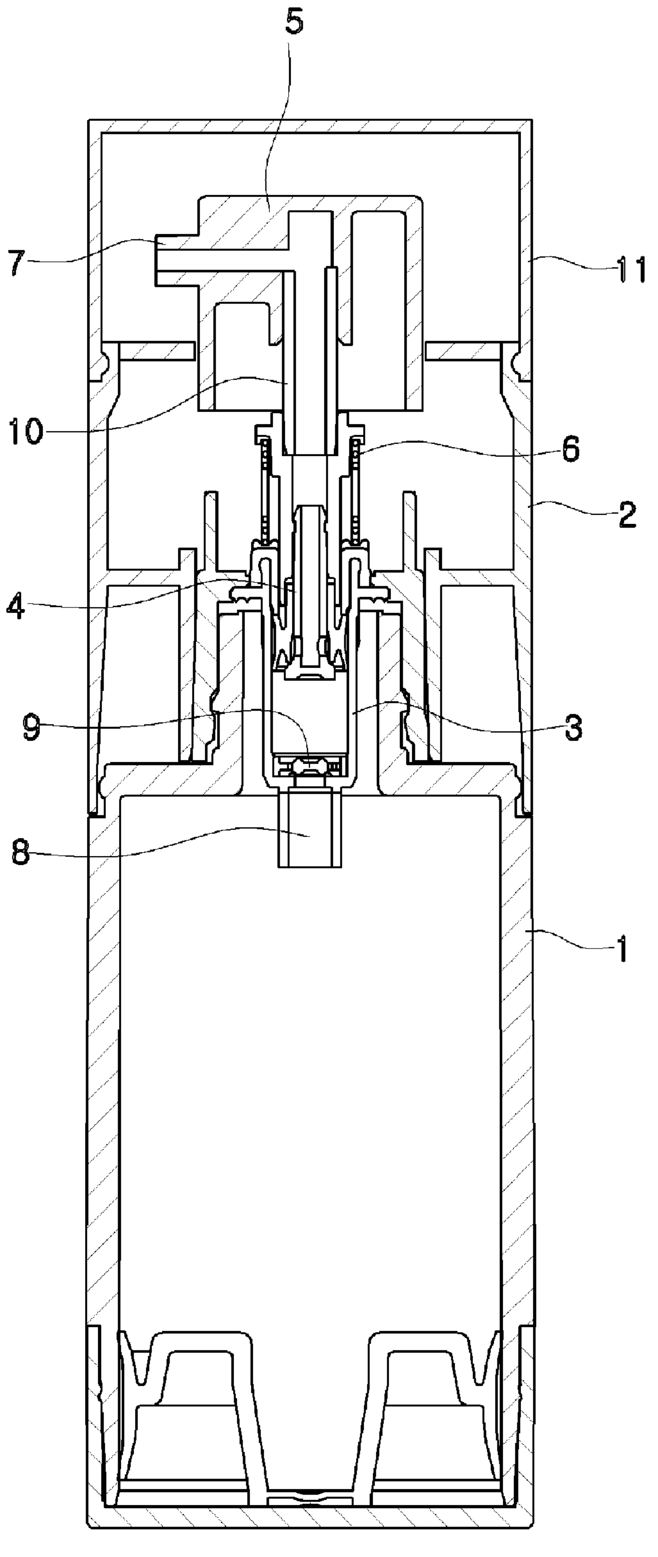

[Fig. 2]
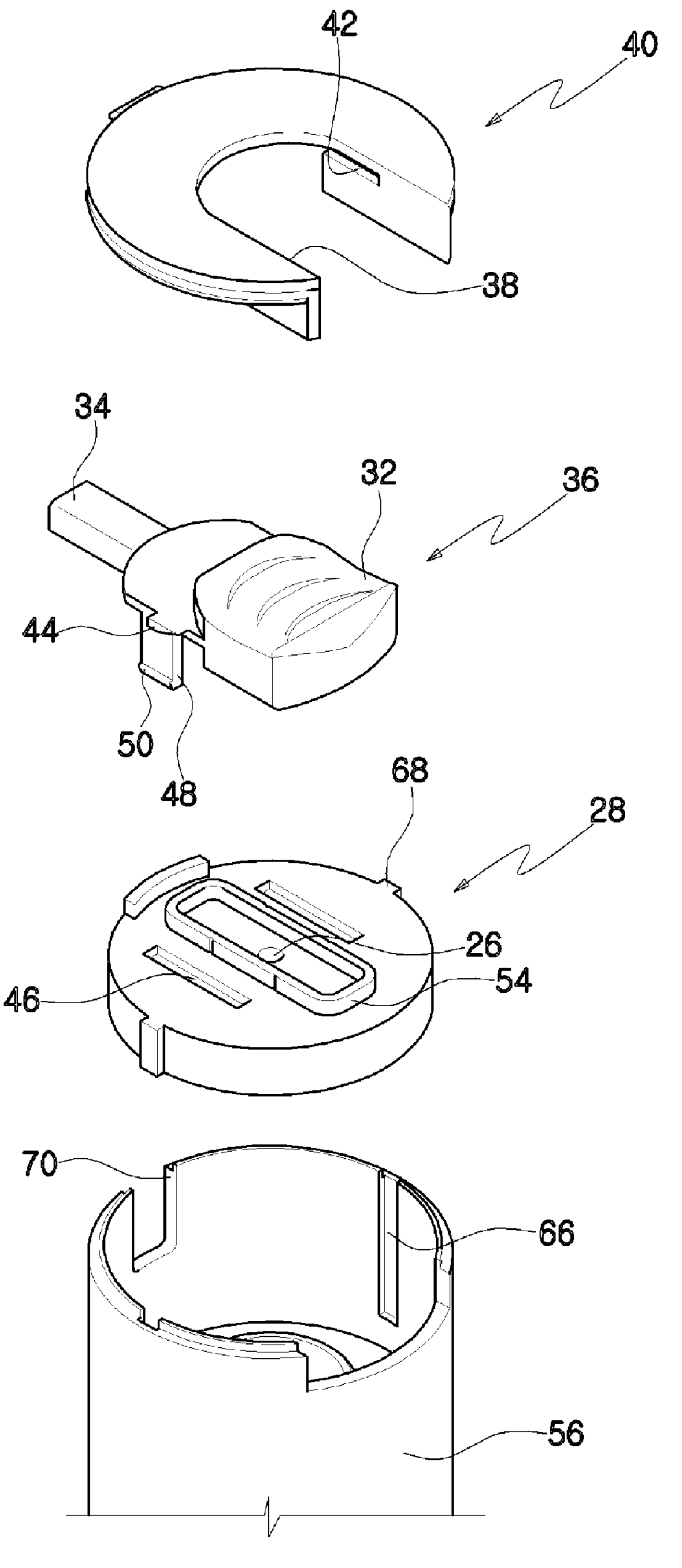

[Fig. 3]
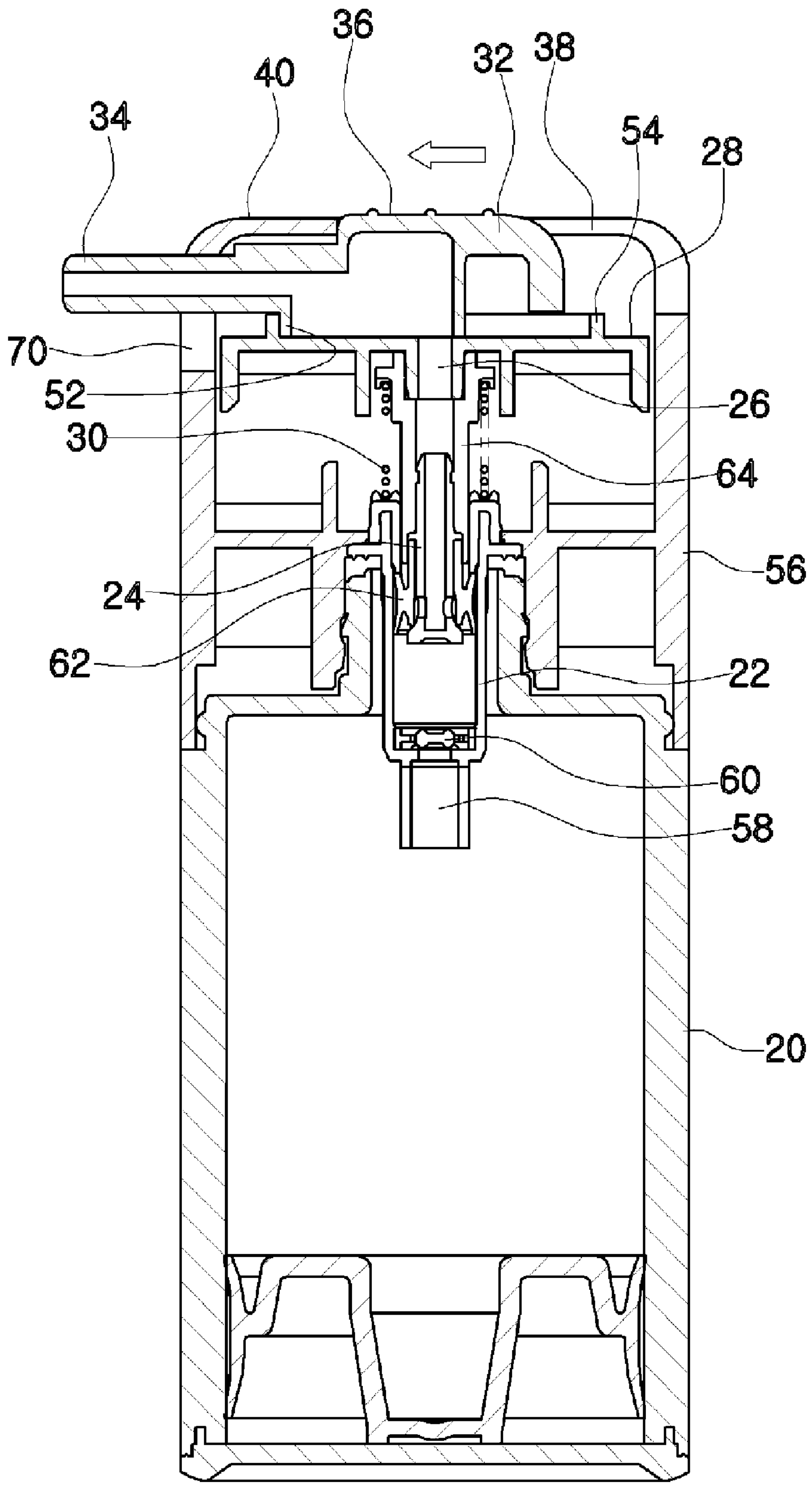

[Fig. 4]
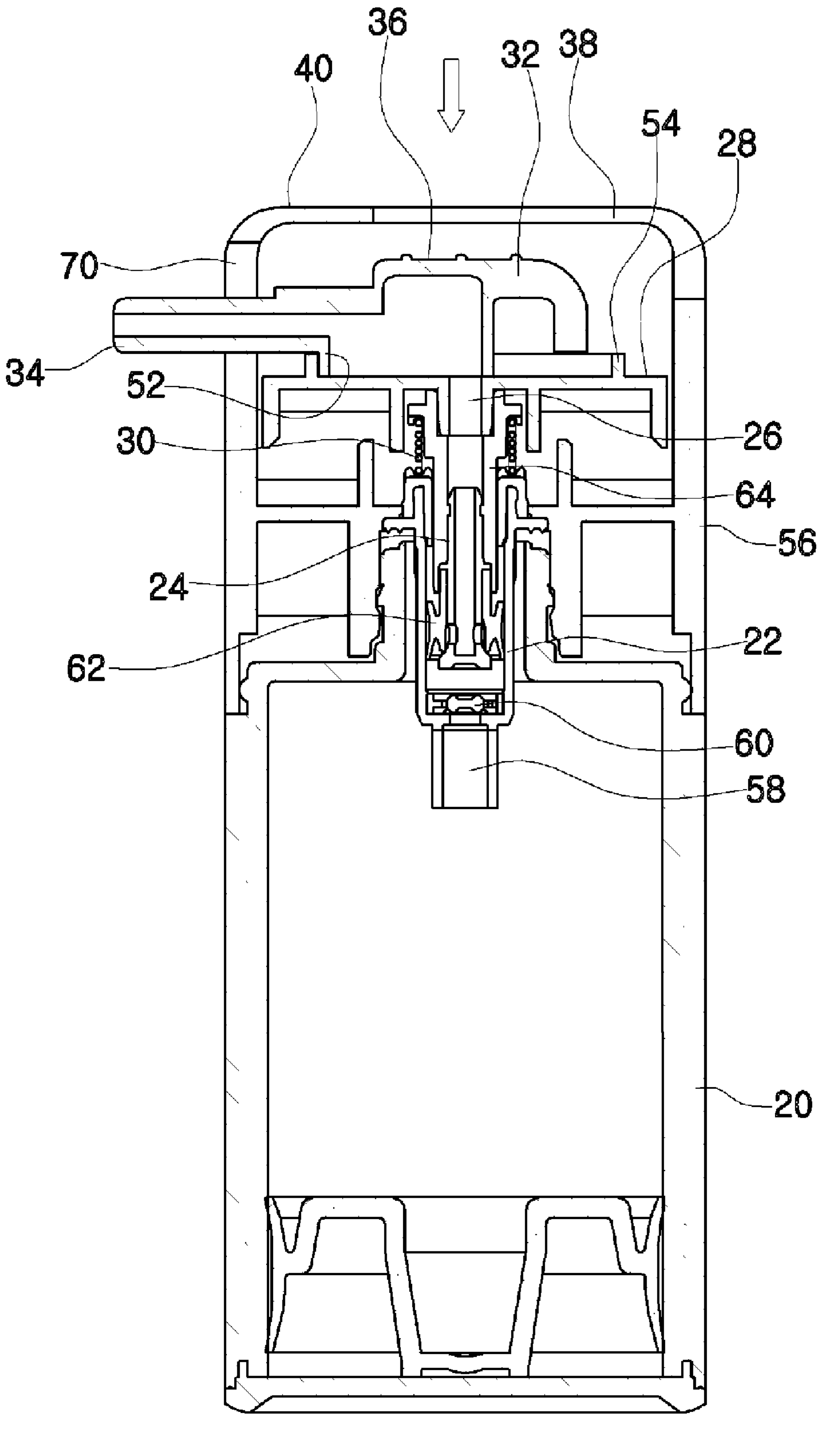

[Fig. 5]
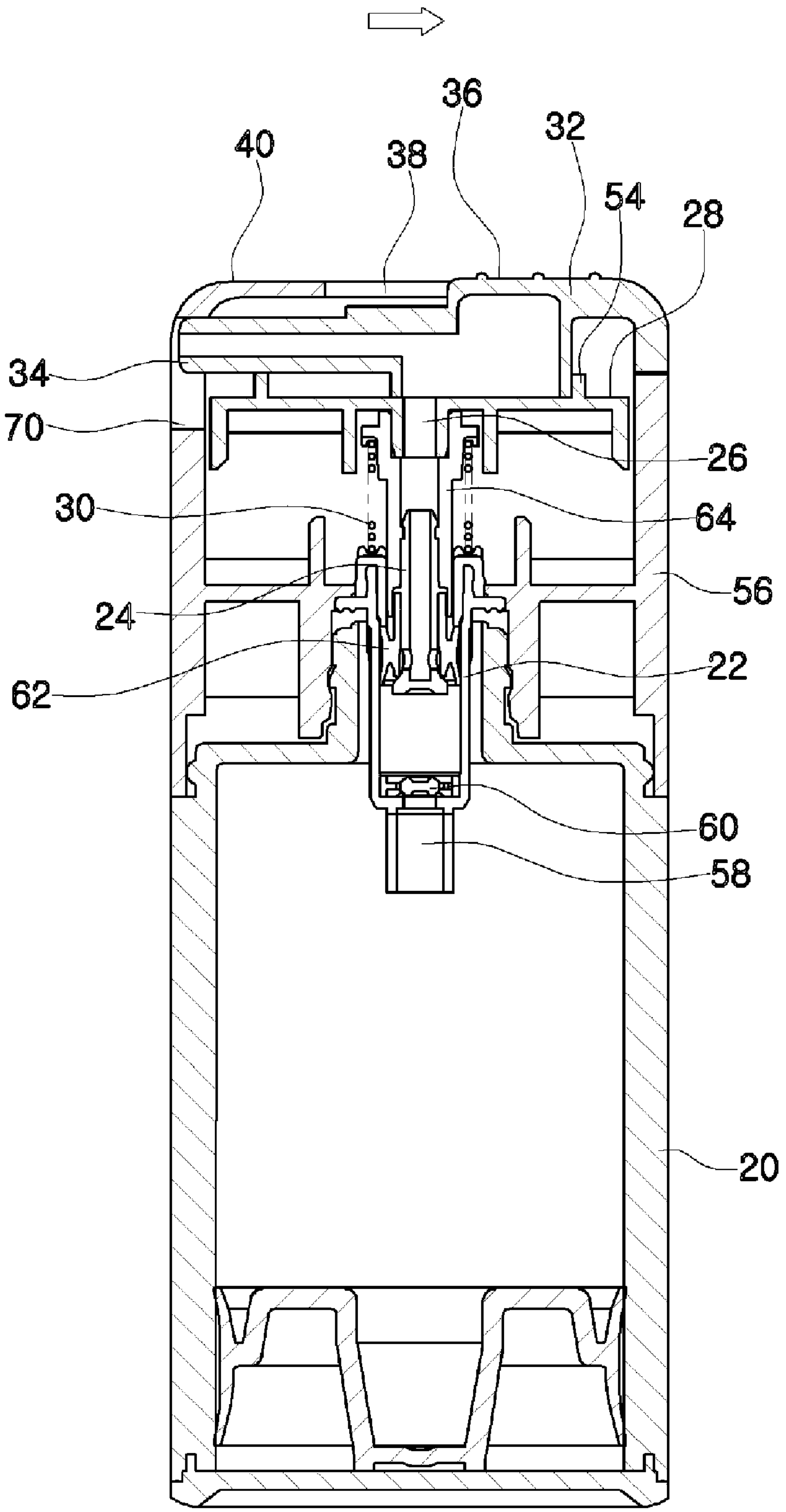

NOZZLE RETRACTABLE DISPENSER

TECHNICAL FIELD

The present invention relates to a nozzle retractable dispenser, and more particularly, to a nozzle retractable dispenser whose nozzle is protruded enough to be lengthy in the lateral direction of a container, so that the dispenser can be conveniently used, and that size of the dispenser can be reduced compact.

BACKGROUND ART

In general, a dispenser accommodating cosmetics or other gel type contents is configured to discharge them through a discharge outlet which is protruded in the lateral direction, if a user operates a pumping button provided at the upper portion of the dispenser.

FIG. 1 shows structure of a conventional dispenser. Referring to FIG. 1, the conventional dispenser includes: a container 1 accommodating certain contents; a cylinder 3 which is combined on top of the container by the medium of a support 2 and communicates from the inner space of the container 1; a piston 4 which ascends and descends in the inside of the cylinder 3; a pumping button 5 which is combined at the upper portion of the support 2 and drives the piston 4 to ascend and descend; and an elastic unit 6 which is interposed between the pumping button 5 and the support 2. The pumping button 5 includes a nozzle 7 which communicates from the cylinder 3. The nozzle 7 is formed to protrude in one direction of the pumping button 5. An inhale inlet 8 through which the contents are inhaled and a check valve 9 are provided at the bottom of the cylinder 3 and a stem 10 is installed between the piston 4 and the pumping button 5 as a connection tube.

In the case of the dispenser of the above-described structure, for convenience in use, the nozzle 7 of the pumping button 5 is protruded toward the lateral direction of the container 1 as illustrated in FIG. 1. However, in the case that the nozzle 7 is protruded excessively toward the lateral direction of the container 1, there arise problems that it is difficult to keep the dispenser in custody and that the nozzle may be broken. Therefore, most of the dispensers have a pumping button whose outer diameter is smaller than that of the container 1, respectively, in which the nozzle 7 is protruded so as not to get out of the outer diameter of the container 1 from the lateral direction of the pumping button 5. In addition, the dispenser further includes an over-cap 11 that covers the pumping button 5 and the nozzle 7 in order to prevent the pumping button 5 from mis-operating when the dispenser is not in use.

However, since the nozzle 7 is protruded in a very short length in the lateral direction of the pumping button 5 in the case of the dispenser of the above-described structure, it is inconvenient for user to receive and use contents from the tip of the nozzle 7. In addition, since an ascending and descending section should be ensured for the pumping button 5, and the over-cap 11 should be additionally mounted in the case of the dispenser of the above-described structure, there are several problems that size of the dispenser becomes larger, it is burdensome to detach and attach the over-cap 11 from and to the dispenser, and the over-cap 11 may be easily lost due to frequent detachment and attachment of the over-cap 11.

DISCLOSURE OF INVENTION

Technical Problem

To solve the above problems, it is an object of the present invention to provide a nozzle retractable dispenser whose nozzle is withdrawn enough to be lengthy in the lateral direction of a container, in which the nozzle is slidingly withdrawn and retracted with respect to the container, so that the dispenser can be conveniently used, and the nozzle is retracted into the inside of the container, so that the dispenser can be safely kept in custody without having a particular over-cap, and that size of the dispenser can be reduced compact.

Technical Solution

To accomplish the above object of the present invention, according to an aspect of the present invention, there is provided a nozzle retractable dispenser comprising:

a container containing contents;

a cylinder which is combined on top of the container so as to communicate from the inner space of the container;

a piston which ascends and descends in the inside of the cylinder;

a pressing member which is installed on top of the container so as to press the piston, and at the center of which a communication hole which communicates with the cylinder is formed;

an elastic unit which is interposed between the pressing member and the container;

a pumping button which is mounted on the upper surface of the pressing member so as to go slidingly forward and backward with respect to the pressing member, in which a button portion is formed at the upper portion of the pressing member, and a nozzle communicating with the communication hole is protruded in a lateral direction of the pressing member; and a cover member which comprises an incision portion which is incised so that the pumping button is exposed, and which is mounted on top of the pumping button so as to cover the circumference of the pumping button, wherein the pumping button goes slidingly forward and backward with respect to the pressing member at the state where the pumping button has been elastically supported by the elastic unit, so as to be withdrawn and retracted in the lateral direction of the container.

Preferably but not necessarily, locking groove portions are formed at the lower portion of the cover member, and locking protrusion portions which are engaged with the locking groove portions is formed in the lateral direction of the pumping button, in which the locking protrusion portions are engaged with the locking groove portions so that the pumping operation of the pumping button is locked when the pumping button goes slidingly backward and thus the nozzle is retracted into the inside of the container.

More preferably but not necessarily, guide groove portions which guide a sliding movement of the pumping button are formed on the pressing member, and guide protrusion portions are formed at the lower portion of the pumping button, in which the guide protrusion portions are inserted into the guide groove portions to then slidingly move, and in which an engagement protrusion is formed at the respective ends of the guide protrusion portions in order to prevent the guide protrusion portions from seceding from the guide groove portions.

ADVANTAGEOUS EFFECTS

As described above, the present invention provides a nozzle retractable dispenser in which a pumping button having a nozzle goes slidingly forward and backward with respect to the pressing member at the state where the pumping button has been elastically supported by the elastic unit. Accordingly, the nozzle can be withdrawn in a sufficient length in the lateral direction of a container during use, by a simple operation of slidingly manipulating the pumping button. As a result, it is convenient for a user to use the dispenser and to receive contents of the container through an exit of the tip of the nozzle. In addition, when not in use, the pumping button goes slidingly backward so as to be retracted into the inside of the container, to thus make the dispenser easily kept in custody. Further, there is no need to use a particular overcap to thus obtain a more compact structure of the dispenser.

In addition, according to the invention, when the nozzle is retracted into the inside of the container, locking protrusion portions which are formed at the side of the pumping button are engaged with locking groove portions which are formed in a cover member, to thus lock operation of the pumping button. Accordingly, the present invention prevents malfunction of the pumping button, and can keep the dispenser in custody more cleanly.

BRIEF DESCRIPTION OF THE DRAWINGS

The above and/or other objects and/or advantages of the present invention will become more apparent by describing the preferred embodiments thereof in detail with reference to the accompanying drawings in which:

FIG. 1 is a cross-sectional view showing structure of a conventional dispenser;

FIG. 2 is a partially disassembled perspective view of a nozzle retractable dispenser according to the present invention;

FIGS. 3 and 4 are cross-sectional views showing a state where a nozzle is withdrawn and used in the dispenser according to the present invention, respectively; and FIG. 5 is a cross-sectional view showing a state where the nozzle is retracted in the dispenser according to the present invention.

BEST MODE FOR CARRYING OUT THE INVENTION

Hereinbelow, a nozzle retractable dispenser according to a preferred embodiment of the present invention will be described with reference to the accompanying drawings. Like reference numerals denote like elements through the following embodiment.

Referring to FIGS. 2 to 5, a dispenser according to a preferred embodiment of the present invention is formed of a basic structure including a container 20, a cylinder 22, a piston 24, and an elastic unit 30 in the same manner as those of a conventional dispenser. Here, although the conventional dispenser is formed of a single member including a pumping button, the dispenser according to the embodiment of the present invention is formed of a combined structure of three members including a pressing member 28, a pumping button 36, and a cover member 40.

A basic structure of the dispenser according to the embodiment of the present invention will be briefly described below before explaining about a nozzle retraction structure of this invention.

The container 20 of the dispenser accommodates cosmetics or other gel type contents. An opening portion is formed on top of the container 20. A support body 56 is combined with the opening portion. The support body 56 is provided to install the cylinder 22 into the container. Hereinbelow, the support body 56 is understood and described as a part of the container 20.

The cylinder 22 is combined on top of the support body 56 so as to communicate with the inner space accommodating contents of the container 20. An inhale inlet 58 is provided in the lower portion of the cylinder 22, through which the contents in the inside of the container 20 are inhaled by a pumping operation of the piston 24. In addition, as shown, a check valve 60 may be provided at the bottom of the cylinder 22 in order to prevent the contents from being excessively inhaled via the inhale inlet 58.

A piston 24 ascends and descends in the inside of the cylinder 22. Preferably, a path through which contents pass is formed along the piston 24, and a sealing member 62 closely adhered to the inner wall of the cylinder 22 is installed around the circumference of the tip of the piston 24.

As will be described later, the pressing member 28, the pumping button 36, and the cover member 40 are mounted in turn on the opening portion of the upper portion of the support body 56. A communication hole 26 which communicates with the cylinder 22 is formed at the center of the pressing member 28, and a nozzle 34 which communicates with the communication hole 26 is provided in the pumping button 36 in which the nozzle 34 is protruded in a lateral direction of the pumping button 28. A hollow stem 64 which communicates the cylinder 22 from the nozzle 34 of the pumping button 36 is installed between the pressing member 28 and the support body 56. An elastic unit 30 is interposed around the circumference of the stem 64. Thus, when the pumping button 36 and the pressing member 28 are pressed with respect to the support body 56, the piston 24 descends along the inside of the cylinder 22, and contents contained in the container 20 is pumped toward the nozzle 34. If an external force applied to the pumping button 36 is released, the pumping button 36 is returned into an original position by an elastic restoring force of the elastic unit 30. As shown, the elastic unit 30 is a coil spring which is installed around the outer circumference of the stem 64. It is desirable that the elastic unit 30 is spatially partitioned from the path of contents contained in the container 20.

The structure of the above-described dispenser has a basic mechanism that the pumping button 36 is manipulated to pump contents contained in the container 20. The container or pumping structure may be configured into various modifications in addition to the above-mentioned embodiment. The nozzle retractable dispenser according to the embodiment of the present invention is characterized in that the nozzle 34 of the pumping button 36 is slidingly withdrawn and retracted in the lateral direction of the container 20. Hereinbelow, the structure and function of the nozzle retractable dispenser will be described in more detail.

Referring to FIG. 2 showing a disassembled perspective view of the nozzle retractable dispenser according to the present invention, a communication hole 26 which communicates with the cylinder 22 and the stem 64 is formed at the center of the pressing member 28. Elongated guide groove portions 46 are respectively formed at both sides of the communication hole 26. In addition, an inhale tube accommodator 54 accommodating an inhale tube 52 of the pumping button 36 which will be described later is vertically stood up around the circumference of the communication hole 26. The pressing member 28 is mounted on top of the container 20, preferably, on top of the support body 56, so as to ascend and descend at the state where the pressing member 28 has been elastically supported by the elastic unit 30. For this, guide groove portions 66 are formed in the inside of the upper portion of the support body 56, and guide protrusion portions 68 which are inserted into the guide groove portions 66 to then ascend and descend is provided in the lateral direction of the pressing member 28.

The pumping button 36 includes the nozzle 34 which communicates with the communication hole 26, and which is protruded in one lateral direction of the pumping button 36. As illustrated in FIGS. 3 and 4 as well as FIG. 2, the inhale tube 52 which contacts the communication hole 26 and whose sliding movement is regulated by the inhale tube accommodation portion 54 is provided at the lower portion of the pumping button 36. The inhale tube 52 is connected with the nozzle 34. A pair of guide protrusions 48 which are inserted into guide grooves 46 and goes slidingly forward and backward are provided at both sides of the inhale tube 52. An engagement protrusion 50 is formed at the end of the guide protrusions 48, respectively, in order to prevent the guide protrusions 48 from seceding upwards from the guide grooves 46, respectively.

A button portion 32 for pushing to manipulate the pumping button 36 is formed on the upper surface of the pumping button 36. Preferably, a number of unevenness portions are formed on the upper surface of the button portion 32 in order to enhance a frictional force to be applied to the button portion 32 at the time of the sliding forward and backward movement of the pumping button 36.

As illustrated in FIGS. 3, and 4 and 5, as well as FIG. 2, the pumping button 36 goes slidingly forward and backward with respect to the pressing member 28, and thus operates so that the nozzle 34 protruded in the lateral direction of the pumping button 36 is withdrawn in the lateral direction of the container 20 and retracted into the inside of the container 20. In addition, the pumping button 36 elastically ascends and descends together with the pressing member 28 by the elastic unit 30 at the state where the pumping button 36 has been withdrawn, so as to pump contents contained in the container 20. As described above, a nozzle ascending and descending groove 70 is formed at one lateral side of the support body 56, so that the nozzle 34 can ascend and descend at the state where the nozzle 34 has been withdrawn.

A cover member 40 is combined with the upper end of the support body 56 so as to cover the pumping button 36. Preferably, an incision portion 38 is formed on the cover member 40 so that the button portion 32 of the pumping button 36 is exposed. Locking groove portions 42 are formed downwards from the circumference of the incision portion 38. In more detail, the locking groove portions 42 are protruded downwards from both sides of the circumference of the incision portion 38, and has a slit-formed structure that the front portion of the locking groove portions 42 are opened and the rear portion thereof is closed. In correspondence to the locking groove portions 42, locking protrusion portions 44 are protruded at both sides of the pumping button 36. Thus, when the pumping button 36 goes slidingly backward with respect to the pressing member 28, the locking protrusion portions 44 are inserted into the locking groove portions 42. At the state where the locking protrusion portions 44 have been inserted into the locking groove portions 42, the ascending and descending operations of the pumping button 36 are locked.

FIGS. 3 and 4 are cross-sectional views showing a state where a nozzle is withdrawn and used in the dispenser according to the present invention, respectively. First of all, when the button portion 32 which is formed on the upper surface of the pumping button 36 goes slidingly forward in an arrow-marked direction of FIG. 3, the pumping button 36 goes forward with respect to the pressing member 28, and thus the nozzle 34 is withdrawn in the lateral direction of the container 20 through the nozzle ascending and descending groove 70 of the support body 46. Here, the pumping button 36 is kept at the state of closely contacting the pressing member 28 by the elastic force of the elastic unit 30. Unless an external horizontal force is applied to the pumping button 36, the nozzle 34 is kept at the state of being withdrawn from the pumping button 36.

If the pumping button 36 is pressed in an arrow-marked direction of FIG. 5 at the state where the nozzle 34 has been withdrawn, the pumping button 36 and the pressing member 28 descend together to thus pump contents contained in the container 20. Accordingly, the contents are discharged through the leading end of the nozzle 34. In addition, if an external horizontal force applied to the pumping button 36 is released, the pumping button 36 is returned into an original position.

Then, if the pumping button 36 is made to go backward in the arrow-marked direction of FIG. 5 in the case that use of the dispenser ends, the pumping button 36 goes backward with respect to the pressing member 28, and thus the nozzle 34 is retracted into the inside of the container 20, as shown. Here, the locking protrusion portions 44 which are formed at both sides of the pumping button 36 is inserted into the locking groove portions 42 of the cover member 40, respectively. Accordingly, the ascending and descending operations of the pumping button 36 are locked.

As described above, in the case of the nozzle retractable dispenser according to the embodiment of the present invention, the pumping mechanism includes three elements of the pressing member 28, the pumping button 36, and the cover member 40. The pumping button 36 goes slidingly forward and backward with respect to the pressing member 28. Accordingly, the nozzle 34 which is protruded in one lateral direction of the pumping button 36 is withdrawn and retracted in the lateral direction of the container 20. Here, the forward and backward sliding movement of the pumping button 36 is regulated by the elastic support force of the elastic unit 30. Accordingly, the free movement of the pumping button 36 is prevented and thus the pumping button 36 is made to go forward and backward only by manipulation of a user.

The pumping operation of the pumping button 36 is possible at the condition where the nozzle 34 has been withdrawn, and the pumping operation of the pumping button 36 is locked at the condition where the nozzle 34 has been retracted. The cover member 40 plays a role of concealing the nozzle 34 at the condition where the nozzle 34 has been retracted into the inside of the container 20, and simultaneously plays a role of locking operation of the pumping button 36.

As described above, a nozzle 34 of a nozzle retractable dispenser according to the present invention is withdrawn enough to be lengthy in the lateral direction of a container 20. Thus, the dispenser can be conveniently used. In addition, it is easy for a user to receive and use contents contained in the container 20 from the tip of the nozzle 34 to the palm of the user. Meanwhile, when the dispenser is not used, the nozzle 34 is retracted into the inside of the container 20, to then be concealed. Accordingly, the dispenser can be safely kept in custody without having a particular over-cap. Further, a space necessary for ascending and descending the pumping button 36 can be minimized. As a result, size of the dispenser can be designed very compact based on the minimized space of the pumping button 36 and the unuse of the over-cap.

MODE FOR THE INVENTION

As described above, the present invention has been described with respect to particularly preferred embodiment. However, the present invention is not limited to the above embodiment, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention provides a nozzle retractable dispenser whose nozzle is protruded enough to be lengthy in the lateral direction of a container, so that the dispenser can be conveniently used, and that size of the dispenser can be reduced compact.

The invention claimed is:

1. A nozzle retractable dispenser comprising: a container (20) containing contents;

a cylinder (22) which is combined on top of the container (20) so as to communicate from the inner space of the container (20);

a piston (24) which ascends and descends in the inside of the cylinder (22);

a pressing member (28) which is installed on top of the container (20) so as to press the piston (24), and at the center of which a communication hole (26) which communicates with the cylinder (22) is formed;

an elastic unit (30) which is interposed between the pressing member (28) and the container (20);

a pumping button (36) which is mounted on the upper surface of the pressing member (28) so as to go slidingly forward and backward with respect to the pressing member (28), in which a button portion (32) is formed at the upper portion of the pressing member (28), and a nozzle (34) communicating with the communication hole (26) is protruded in a lateral direction of the pressing member (28); and a cover member (40) which comprises an incision portion (38) which is incised so that the pumping button (36) is exposed, and which is mounted on top of the pumping button (36) so as to cover the circumference of the pumping button (36), wherein the pumping button (36) goes slidingly forward and backward with respect to the pressing member (28) at the state where the pumping button (36) has been elastically supported by the elastic unit (30), so as to be withdrawn and retracted in the lateral direction of the container (20), wherein an inhale tube (52) which communicates with the communication hole (26) of the pressing member (28) is formed at the lower portion of the pumping button (36) and an inhale tube accommodator (54) accommodating the inhale tube (52) is formed in a vertically stood form on top of the pressing member (28) so that a sliding movement of the inhale tube (52) is regulated.

2. The nozzle retractable dispenser according to claim 1, wherein locking groove portions (42) are formed at the lower portion of the cover member (40), and locking protrusion portions (44) which are engaged with the locking groove portions (42) are formed in the lateral direction of the pumping button (36), in which the locking protrusion portions (44) are engaged with the locking groove portions (42) so that the pumping operation of the pumping button (36) is locked when the pumping button (36) goes slidingly backward and thus the nozzle (34) is retracted into the inside of the container (20).

3. The nozzle retractable dispenser according to claim 1, wherein guide groove portions (46) which guide a sliding movement of the pumping button (36) is formed on the pressing member (28), and guide protrusion portions (48) are formed at the lower portion of the pumping button (36), in which the guide protrusion portions (48) are inserted into the guide groove portions (46) to then slidingly move, and in which an engagement protrusion (50) is formed at the respective ends of the guide protrusion portions in order to prevent the guide protrusion portions (48) from seceding from the guide groove portions (46).

4. The nozzle retractable dispenser according to claim 2, wherein guide groove portions (46) which guide a sliding movement of the pumping button (36) is formed on the pressing member (28), and guide protrusion portions (48) are formed at the lower portion of the pumping button (36), in which the guide protrusion portions (48) are inserted into the guide groove portions (46) to then slidingly move, and in which an engagement protrusion (50) is formed at the respective ends of the guide protrusion portions in order to prevent the guide protrusion portions (48) from seceding from the guide groove portions (46).

* * * * *